Figure 1:
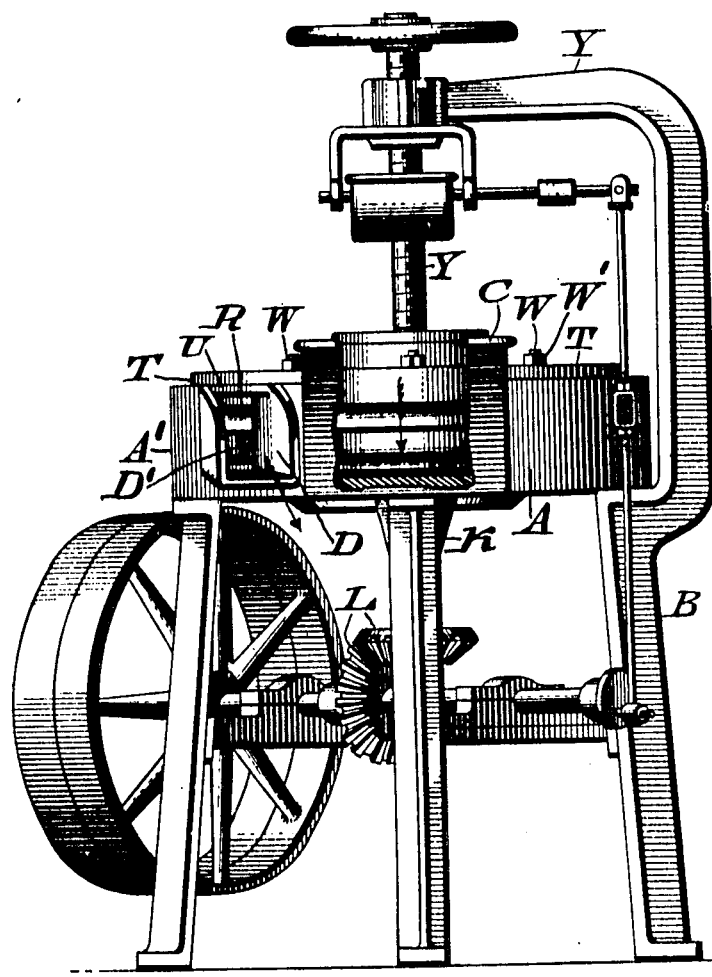

No. 874,480. PATENTED DEC. 24, 1907.
G. P. BAILEY.
MACHINE FOR KNEADING AND MOLDING DOUGH.
APPLICATION FILED MAR. 12, 1907.

2 SHEETS—SHEET 1.

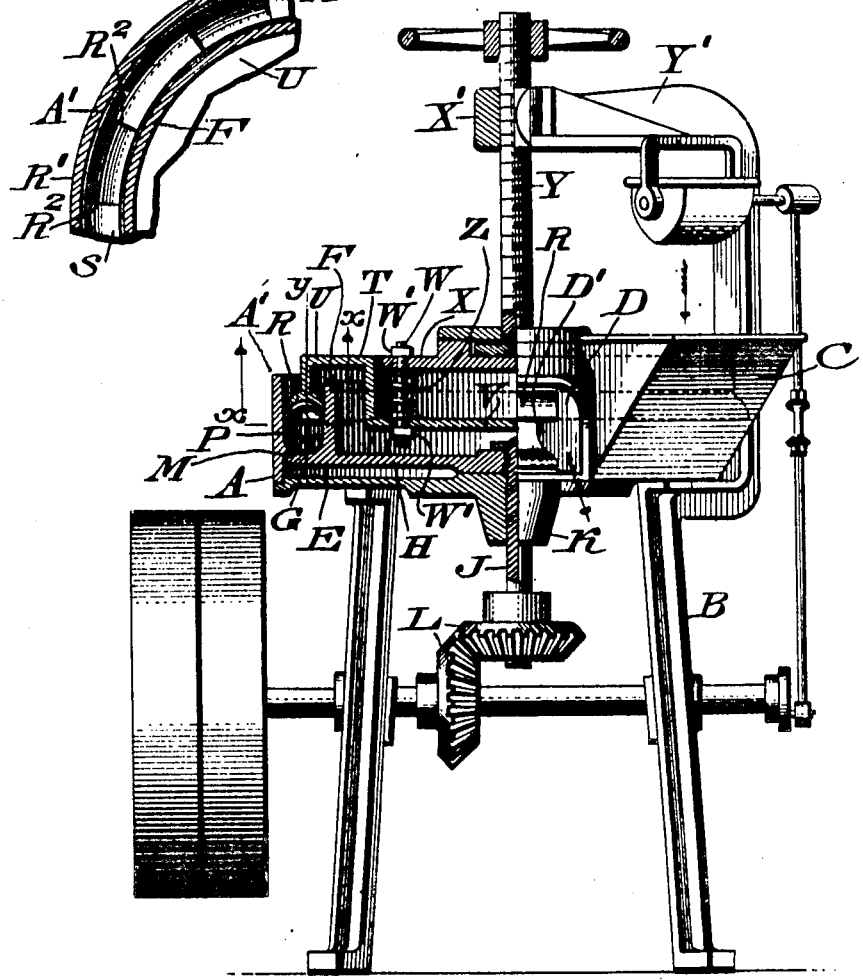

UNITED STATES PATENT OFFICE.

GEORGE P. BAILEY, OF PHILADELPHIA, PENNSYLVANIA.

MACHINE FOR KNEADING AND MOLDING DOUGH.

No. 874,480.	Specification of Letters Patent.	Patented Dec. 24, 1907.

Application filed March 12, 1907. Serial No. 361,984.

*To all whom it may concern:*

Be it known that I, GEORGE P. BAILEY, a citizen of the United States, residing in the city and county of Philadelphia, State of Pennsylvania, have invented a new and useful Machine for Kneading and Molding Dough, of which the following is a specification.

My invention relates to a machine for working dough, and consists of means for subjecting dough to a constant pressure during the kneading and molding operations, next of means for kneading and molding the dough, and finally of details of construction as will be hereinafter set forth, the novel features being pointed out in the claims.

Figure 1 represents a side elevation, partly broken away, of a dough kneading and molding machine embodying my invention. Fig. 2 represents a partial side elevation and a partial vertical section thereof. Fig. 3 represents a horizontal section of a portion on line $x$—$x$, Fig. 2. Fig. 4 represents a vertical section of a portion on line $y$—$y$, Fig. 2.

Similar letters of reference indicate corresponding parts in the figures.

Referring to the drawings: A designates a pan, which is supported on the legs B, and provided with a supply hopper C and discharge chute D, the same being connected with respective portions of the side wall A' of said pan.

E designates a runner which occupies the pan A, and is composed of the side wall F, the base G, and the frame H, the latter being secured at its center to the shaft J, which passes through the boss or bearing K on the under side of the pan A, and is adapted to be rotated by the gearing L, to which power is communicated in any suitable manner, the runner E being thereby rotated. It will be noticed that the wall F is adjacent to the side wall A' of the pan A, but separated sufficiently therefrom to leave a space between the same. The base G extends outwardly from the lower end of said wall F close to the wall A', its outer edge being covered by the bead or rim M which extends inwardly from the wall A' and overhangs said edge, it now being seen that the walls F and A', base G, and bead M form the chamber P, in which latter the dough is received and worked, the hopper C and the chute D being in communication with said chamber.

The cover or top of the chamber P consists of a circular rim R, in whose under side is the channel S, said cover entering said chamber P and depending from the frame T, the peripheral portion U of which is above the wall F of the runner, and the central portion V of which is depressed and freely receives the bolts W, which depend from the plate X which is held at the top of the frame T above the central portion thereof by the screw Y which is swiveled on said plate and fitted in a boss X' on the arm Y' which rises from one of the legs B or other suitable part.

Fitted on the bolts W and interposed between the depressed portion V of the frame T and said top plate X, are the springs Z, it being noticed that the ends of the bolts W are provided with nuts W' for retaining the same in position on the respective parts and adjusting the tension of said springs.

The channel S of the rim R is extended at intervals upwardly to a greater extent, forming the pockets R', the side walls of which form the shoulders R² for purposes to be hereinafter described.

On the discharge chute D, is the side wall D' for directing the dough as worked from the chamber P to said chute, and then cause the ejection of the same.

The operation is as follows:—A lump of dough is placed in the hopper C and power communicated to the shaft, whereby the runner E is rotated within the pan A, the dough after leaving the hopper entering the chamber P, whereby it is carried around the latter by said runner and subjected to continuous and variable pressure, said pressure, as is evident, avoiding deadness of action on the dough and so properly working the latter, it being noticed that when the dough reaches a pocket R', it expands and some of it enters the same, and strikes the shoulder R² thereof, when it again enters the adjacent portion of the channel S, and so is reduced in thickness, after which when it reaches the next pocket it expands and some of it enters the same and strikes the shoulder R² thereof, after which it enters the next adjacent portion of the channel S, and thus the several operations continue, the effect of which is a turning and kneading of the dough, and as it is carried around the chamber P, it is rolled into spherical form or comparatively so, in which condition it reaches the chute D, when owing to the side or side wall D' therein, it is discharged in condition to be placed in a pan for baking.

While I have specified certain means for carrying out my improvements, I do not wish to be limited exactly to the same, but desire to make such changes as may come within the scope of the novelty involved.

Having thus described my invention, what I claim as new and desire to secure by Letters Patent, is:—

1. In a dough kneading and molding machine, a pan, a runner therein, and a relatively stationary upper member, forming together a dough receiving chamber, said member being provided upon its face with dough-turning and kneading shouldered pockets and means for exerting yielding pressure on said member.

2. In a dough kneading and molding machine, a pan, a runner therein, and a relatively stationary upper member, forming together a dough receiving chamber, said member being provided upon its face with dough-turning and kneading shouldered pockets, means for exerting pressure on said member, and means for adjusting said pressure means.

3. In a dough kneading and molding machine, a pan, a runner therein, and a relatively stationary upper member, forming together a dough receiving chamber, said member being provided upon its face with dough-turning and kneading shouldered pockets, means for rotating said runner, and a support for said member.

4. In a dough kneading and molding machine, a pan, a runner, the latter being formed of a side wall and base, separated from the side wall of the pan, a top member, and a rim projecting inwardly from the side wall of the pan and adapted to freely overhang the edge of said base.

5. In a dough kneading and molding machine, a pan, a runner therein, and a relatively stationary upper member, forming together a dough receiving chamber, means for rotating said runner, a support for said member, a pressure device adapted to bear upon said support, a movable plate adapted to engage said device, and means connected with said plate to adjust said device.

6. In a dough kneading and molding machine, a pan, a runner therein, and a relatively stationary upper member, forming together a dough receiving chamber, said member being provided upon its face with dough-turning and kneading means, means for rotating said runner, a support for said member, a movable plate, a bolt freely connecting said support with said plate, a spring adapted to bear upon said support, and a screw adapted to be connected with said plate to adjust the tension of said spring.

7. In a dough kneading and molding machine, a spring-pressed non-rotatable molding member, having in a face thereof a channel, and a pocket alternating therewith, said molding member forming a yielding pressure device.

8. In a dough kneading and molding machine, a spring-pressed non-rotatable molding member, having at intervals in a face thereof pockets, and shoulders on the sides of the same, said molding member forming a yielding pressure device.

9. In a dough kneading and molding machine, a pan, a rotatable runner therein and a vertically yieldable stationary molding member interposed between said runner and the wall of the pan.

10. In a dough kneading and molding machine, a pan, a rotatable runner therein and a stationary molding member interposed between said runner and the wall of the pan and having at intervals in its under face pockets with shoulders.

11. In a dough kneading and molding machine, a pan, a rotatable runner therein and a stationary molding member interposed between said runner and the wall of the pan and having upon its under face a channel with depressions at intervals forming pockets.

12. In a dough kneading and molding machine, a pan, a rotatable runner therein having a vertical wall, a relatively fixed member yieldingly mounted, and a molding member carried thereby and provided upon its face with dough-turning and kneading means and depending within the space between said wall and the wall of the pan.

13. In a dough kneading and molding machine, a pan, a rotatable runner therein having a vertical wall, a relatively fixed member yieldingly mounted, and a molding member carried thereby and depending within the space between said wall and the wall of the pan and having in its under face a channel with spaced depressions forming pockets with shoulders on the side thereof.

GEORGE P. BAILEY.

Witnesses:
JOHN A. WIEDERSHEIM,
HARRY C. DALTON.